United States Patent [19]

Kornaker

[11] 4,130,836

[45] Dec. 19, 1978

[54] ARRANGEMENT FOR MOUNTING AND ADJUSTING A DEFLECTION-COIL HOLDER FOR A COLOR-PICTURE TUBE

[75] Inventor: Walter Kornaker, Esslingen-Berkheim, Germany

[73] Assignee: International Standard Electric Corporation, New York, N.Y.

[21] Appl. No.: 832,262

[22] Filed: Sep. 12, 1977

[51] Int. Cl.² ............ H04N 5/64

[52] U.S. Cl. ............ 358/248; 335/210; 335/212; 358/249

[58] Field of Search ............ 358/248, 249; 335/210, 335/212

[56] References Cited

U.S. PATENT DOCUMENTS

| | | | |
|---|---|---|---|
| 3,189,775 | 6/1965 | Fyler | 335/212 |
| 3,786,185 | 1/1974 | Shrader | 358/248 |
| 3,986,156 | 10/1976 | Smith | 358/248 |
| 4,016,363 | 3/1977 | Deal et al. | 358/248 |

*Primary Examiner*—Robert L. Richardson
*Assistant Examiner*—Edward L. Coles
*Attorney, Agent, or Firm*—John T. O'Halloran; Alfred C. Hill

[57] ABSTRACT

The deflection-coil holder for holding in position the toroidal core together with the deflection coils is mounted and adjusted with the aid of straddling dowels floatingly retained in the deflection-coil holder and engaging into sleeve carriers arranged on a mounting member which is secured to the cathode-ray tube envelope.

5 Claims, 4 Drawing Figures

ARRANGEMENT FOR MOUNTING AND ADJUSTING A DEFLECTION-COIL HOLDER FOR A COLOR-PICTURE TUBE

BACKGROUND OF THE INVENTION

The present invention relates to an arrangement for mounting and adjusting a deflection-coil holder for a cathode-ray tube, and more particularly for a color picture tube of the shadow-mask type, said holder substantially holding in position a ferrite toroidal core and two pairs of coils, one for horizontal and one for vertical deflection, in which a mounting member is connected with the conical portion of the picture-tube envelope, comprising means for mounting and adjusting the deflection-coil holder.

Such arrangements are known, for example, from the German Printed Patent Application (DT-AS) No. 22 24 702. According to this publication, a ring-shaped mounting member is bonded to the conical portion of the picture-tube envelope with the aid of a first adhesive. On this mounting member there are provided at least three stay bolts engaging corresponding openings in the deflection-coil holder. Following the adjustment, the spaces remaining in the openings are filled with a second adhesive. According to one modification of this arrangement, it is proposed that in the ring-shaped mounting member, additionally still the heads of at least three screws are fixed as well with the aid of the first adhesive, with the screw shafts thereof then serving as threaded bolts with the aid of which the adjustment is carried out by means of knurled adjusting wheels and nuts, with the effected adjustment also in this case being fixed with the aid of a second adhesive.

In both cases it is not possible to detach the ring-shaped mounting member and the deflection-coil holder with the deflection system after the adjustment has been carried out and following the bonding, without damaging or destructing at least a part of the envelope, or to separate the parts from one another. This, however, is desirable with a view to the high prices of the picture-tube envelopes, in order to be able to reuse the envelope in cases where it has been found to be faulty. Moreover, a bonding causes intervals during the production process, because after each bonding operation it is necessary to wait until the adhesive has become sufficiently solidified and cured.

SUMMARY OF THE INVENTION

It is the object of the present invention, therefore, to avoid a bonding when attaching the deflection-coil holder with the deflection system to the mounting member connected with the conical portion of the picture-tube envelope, and during adjustment, and to provide a simple and inexpensive detachable connection therefor.

A feature of the present invention is the provision of an arrangement for mounting and adjusting a deflection-coil holder for a color-picture tube comprising: a mounting member connected to the conical portion of an envelope of the tube; at least three sleeve carriers are secured to the mounting member; a guide groove in each of the carriers; straddling dowels floatingly retained in each of the guide grooves and each bore in the sleeve carriers, the straddling dowels being attached to the deflection-coil holder; and screws to be screwed into each of the straddling dowels where tightening of the screws controls the depth of immersion of the straddling dowels into the bores of the sleeve carriers and the position of the straddling dowels in the guide grooves of the deflection-coil holder is fixed.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
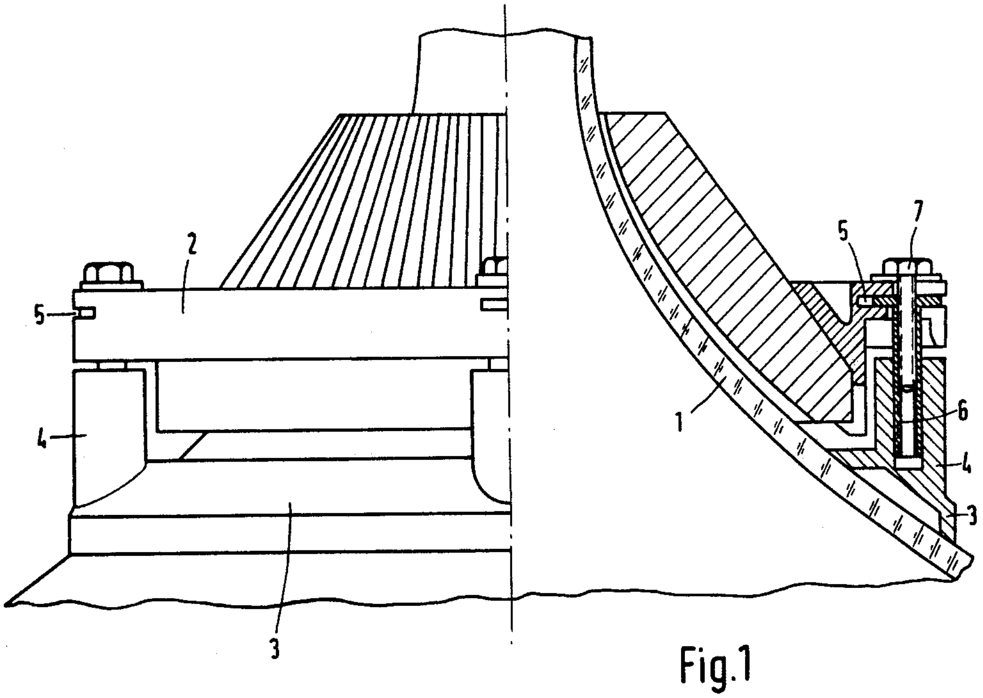
FIG. 1 shows an arrangement according to the principles of the present invention for mounting and adjusting a deflection-coil holder serving to hold in position the deflection coils, i.e. as a side view in the left half of the drawing and as a cross-sectional view in the right-hand half of the drawing.
Figure 2:
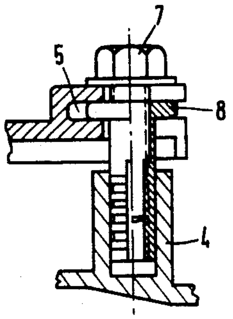
FIG. 2 is a cross-sectional view showing a sleeve carrier according to the principles of the present invention as attached to the mounting member, with the straddlingdowel inserted.
Figure 4:
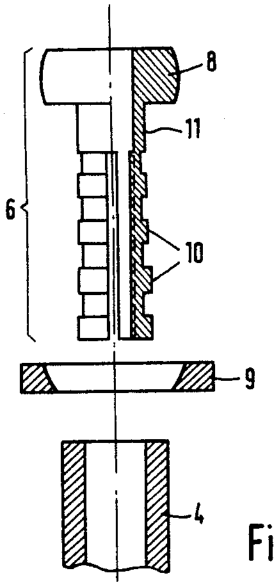
FIG. 4 shows parts of FIG. 3 in greater detail.
Figure 3:
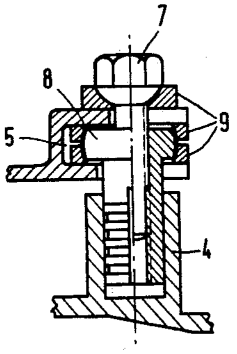
FIG. 3 shows a cross-sectional view of a sleeve carrier according to the principles of the present invention with the straddling dowel inserted, with the head of the dowel being designed as a spherical segment of a ball joint.

Identical parts in the drawing are indicated by the same reference numerals. Referring now to FIG. 1, there is shown a deflection system employing the arrangement according to the present invention for mounting and adjusting the deflection-coil holder including the toroidal core and the two pairs of coils, one for horizontal and one for vertical deflection. In the left-hand half of the drawing this arrangement is shown in a side view, and as a cross-sectional view in the right-hand half. The reference numeral 1 indicates a section taken through the conical portion of the picture-tube envelope whose outlines are shown at three points in the left-hand half of the drawing. The reference numeral 2 indicates the deflection-coil holder for the ferrite toroidal core including the pairs of coils for the horizontal and the vertical deflection, and the reference numeral 3 indicates the mounting member provided with sleeve carriers 4, the bores of which are engaged by straddling dowels 6. By turning a screw 7 into the straddling dowel 6 the slotted lower part of the straddling dowel 6 is caused to expand and the piston-ring type wall thickenings 10 as provided on its outer surface, are firmly placed against the wall of the bore inside the sleeve carrier 4, thus fixing the position of the straddling dowel 6 inside the sleeve carrier 4. This slotted lower part of the straddling dowel is followed by a non-slotted smooth portion of shaft 11. The diameter of this non-slotted shaft portion 11 of the straddling dowel is so dimensioned that this portion will be slidably guided inside the bore of the sleeve carrier 4. In order to avoid a tilting of the straddling dowels 6 inside the sleeve carrier 4, care will have to be taken that this non-slotted shaft portion 11, similar to a cylinder guide, immerses sufficiently deep into the bore of the sleeve carrier 4. At the end of the smooth shaft portion 11 there is provided a bead 8 with the aid of which the straddling dowel 6 is capable of being displaced in a guide groove 5 in a way resembling a Vee-guide, inside the deflection-coil holder 2. Relative thereto, and as shown in FIG. 2, the bead 8 may be designed to have the shape of a circular ring plate, but may also, as is shown in FIGS. 3 and 4, have the shape of a spherical segment which then, together with corresponding discs 9 having spherical shell surfaces, forms a ball joint. When in the guide groove 5, the bead 8 either designed to have the shape of a circular ring plate or, together with discs 9, and designed as a ball joint, has so much lateral play as to enable a sufficient displacement of the deflection-coil holder in one plane extending vertically in relation to the picture-tube axis. In cases where a displacement has to be performed in a sloping plane, it is appropriate to use the straddling dowels 6 according to FIGS. 3 and 4 even though in the case of small angles of inclination, and adjustment should be possible also with the aid of the straddling dowels according to FIG. 2.

In its adjusted position the deflection-coil holder 2 is fixed by tightening the screws 7. In the embodiment according to FIG. 2 the circular ring plate shaped bead 8 is pressed against the wall of the deflection-coil holder by means of the screw and a washer placed beneath the head thereof, and is thus fixed in position. In the embodiment according to FIGS. 3 and 4, the head of the screw 7, as a supporting surface, is provided with a spherical or ballshaped surface resting in a further disc 9 comprising a corresponding spherical or ball-shaped surface, so that by way of clamping, the ball joint and, consequently, also the deflection-coil holder is fixed in its adjusted position. While in the hitherto described fixation with the aid of the screw 7, an adjustment is effected in direction of the picture-tube axis by either lowering or lifting the straddling dowels 6 in the sleeve carrier 4, as well as vertically in relation thereto by utilizing the clearance of the bead 8 of the straddling dowels 6 in the guide groove 5. Both adjusting processes, if so required may also be carried out separately, in that the adjustment is performed at first in direction of the picture-tube axis, with this adjustment then being fixed by screwing headless screws into the slotted portion of the straddling dowels 6. Thereafer, the adjustment may be carried out vertically in relation to the picture-tube axis, which is then fixed by tightening correspondingly shorter head screws 7 which now only enter the non-slotted shaft portion 11.

While I have described above the principles of my invention in connection with specific apparatus it is to be clearly understood that this description is made only by way of example and not as a limitation to the scope of my invention as set forth in the objects thereof and in the accompanying claims.

I claim:

1. An arrangement for mounting and adjusting a deflection-coil holder for a color-picture tube comprising:
   a mounting member connected to the conical portion of an envelope of said tube;
   at least three sleeve carriers are secured to said mounting member;
   a guide groove in each of said carriers;
   straddling dowels floatingly retained in each of said guide grooves and each bore in said sleeve carriers, said straddling dowels being attached to said deflection-coil holder; and
   screws to be screwed into each of said straddling dowels where tightening of said screws controls the depth of immersion of said straddling dowels into said bores of said sleeve carriers and the position of said straddling dowels in said guide grooves of said deflection-coil holder is fixed.

2. An arrangement according to claim 1, wherein said straddling dowel includes
   a bead on the end thereof adjacent said screws.

3. An arrangement according to claim 2, wherein said bead is a circular ring plate which aids in clamping said straddling dowel to said deflection-coil holder upon tightening said screws.

4. An arrangement according to claim 2, wherein said bead is a spherical segment; and
   said screws are provided with a spherical surface; and further including
   a pair of discs each provided with spherical surface to form a ball joint with said spherical surface of said screws, said ball joint being maintained in position by tightening said screws, thus firmly clamping said straddling dowel to said deflection-coil holder.

5. An arrangement according to claim 1, wherein said straddling dowel includes
   a non-slotted smooth shaft portion having a diameter cooperating with the diameter of the bore inside said sleeve carriers are chosen to be in such a relation to each other as to result in a cylinder guide so that said smooth shaft portion is permitted to enter a predetermined amount into the bore of said sleeve carriers.

* * * * *